United States Patent
Lu et al.

(10) Patent No.: US 8,230,496 B2
(45) Date of Patent: Jul. 24, 2012

(54) METHOD FOR IMPROVING SECURITY OF THE SECURITY TOKEN AND APPARATUS THEREFOR

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1136 days.

(21) Appl. No.: 11/854,668

(22) Filed: Sep. 13, 2007

(65) Prior Publication Data

US 2008/0092232 A1    Apr. 17, 2008

(30) Foreign Application Priority Data

Oct. 12, 2006    (CN) .......................... 2006 1 0113676

(51) Int. Cl.
G06F 7/04    (2006.01)
(52) U.S. Cl. .......................... 726/20; 713/186
(58) Field of Classification Search .................. 713/186, 713/182, 185; 382/115; 726/20
See application file for complete search history.

(56) References Cited

U.S. PATENT DOCUMENTS

| | | | |
|---|---|---|---|
| 2004/0019292 A1 * | 1/2004 | Drinan et al. | 600/547 |
| 2006/0104433 A1 * | 5/2006 | Simpson et al. | 379/266.07 |
| 2007/0094509 A1 | 4/2007 | Wei et al. | |

FOREIGN PATENT DOCUMENTS

| | | |
|---|---|---|
| CN | 1540568 | 10/2004 |
| CN | 1859095 | 11/2006 |

* cited by examiner

*Primary Examiner* — Edward Zee
*Assistant Examiner* — Suman Debnath
(74) *Attorney, Agent, or Firm* — Hammer & Associates, P.C.

(57) ABSTRACT

A method for improving security of the security token, comprising the steps of: detecting the bioelectrical signal of the host user; and allowing the host to access the data stored in the security token after verifying the user. The process of detecting the bioelectrical signal of the host user further comprises the following steps of: capturing the bioelectrical signal of the user; processing the captured bioelectrical signal to produce a bioelectrical feature vector; comparing the bioelectrical feature vector with the previously stored feature vector templates; and verifying the user if the comparing result is greater than or equal to a previously specified threshold. The present also provides two embodiments of an apparatus for improving security of the security token. The present invention eliminates the security problems of the prior art and improves the reliability and security of the security token.

13 Claims, 5 Drawing Sheets

METHOD FOR IMPROVING SECURITY OF THE SECURITY TOKEN AND APPARATUS THEREFOR

FIELD OF THE INVENTION

The present invention relates to a security token, and more particularly, to a method for improving security of the security token and an apparatus therefor.

BACKGROUND OF THE INVENTION

As the rapid development of the Internet and e-business technologies, business activities are increasingly conducted over the net. Face-to-face business transactions are being replaced with online transactions, which do not need the two sides to meet with each other actually. Government departments also apply the technologies to improve their working efficiency. To secure the information transmitted over the network, authentication means for its users must be taken into account. Access to the critical data is allowed only when the user has been authenticated.

In the prior art, the security token is used to store critical data and is connected to a host for authenticating. The user must enter a preset password through the host to enable the host to read the data stored on the security token. But the password is a simple string of characters which is easy to be guessed and cracked.

To increase security of the security token, a fingerprint authentication unit is added to the security token. The user must be authenticated for fingerprint before the critical data stored on the token can be accessed.

Referring to FIG. 1, it's a flow chart for the prior art. The procedure of increasing security of the security token comprises the following steps:

101. First, store fingerprints of all potential users on the security token, which are sorted by the user ID;

102. The user enters fingerprint information through the fingerprint authentication unit along with the ID;

103. The fingerprint authentication unit retrieves the fingerprint with the ID, and collates the fingerprint with the entered fingerprint;

104. If the two fingerprints are identical, the user's identity is valid; the fingerprint authentication unit sends confirmation to the security token;

105. After receiving the confirmation, the security token allows the host to access its data.

However, the fingerprint could be reproduced using biological technology, and can be concealed in latex, so that reliability and security of the security token is compromised.

SUMMARY OF THE INVENTION

To increase security and reliability of the security token in authenticating users, the present invention provides a method for improving security of the security token and an apparatus therefor.

In one aspect of the present invention, there is provided a method for improving security of the security token, comprising the steps of: detecting the bioelectrical signal of the host user; and allowing the host to access the security token after verifying the user.

Preferably, the process of detecting the bioelectrical signal of the host user further comprises the following steps of: capturing the bioelectrical signal of the user; processing the captured bioelectrical signal to produce a bioelectrical feature vector; comparing the bioelectrical feature vector with previously stored feature vector templates; and verifying the user if the comparison result is greater than or equal to a previously specified conditional value.

Preferably, the previously specified conditional value is a threshold, and the user is a valid user if the comparison result is greater than or equal to the threshold.

Preferably, the process of processing the bioelectrical signal to produce the bioelectrical feature vector further comprises the following steps of: handling the captured bioelectrical signal by such operations as amplifying, filtering, and/or A/D converting; and extracting bioelectrical feature parameters from the handled bioelectrical signal and evaluating the bioelectrical feature vector from said bioelectrical feature parameters.

Preferably, the process of extracting bioelectrical feature parameters from the handled bioelectrical signal comprises:

evaluating the slopes of a wave period of the bioelectrical signal;

evaluating the time to peak of the wave period of the bioelectrical signal;

evaluating the variance of values of sampling points of the wave period of the bioelectrical signal;

evaluating the high-order moment of the wave period of the bioelectrical signal;

evaluating the covariance of the wave period of the bioelectrical signal.

Preferably, said slopes of the wave period of the bioelectrical signal include an ascending slope from the origin to the first peak, the ascending slope from the first valley to the second peak, a descending slope from the peak to the lowest point, and the ascending slope of the last peak.

Preferably, said time to peak of the wave period of the bioelectrical signal includes the time elapsed from the origin to the first peak, and the time elapsed from the first peak to the last peak.

Preferably, the process of evaluating the variance of values of sampling points of the wave period of the bioelectrical signal is to compute the variances of the values of the sampling points of the first n periods and their average.

Preferably, the process of evaluating the high-order moment of the wave period of the bioelectrical signal is to compute the 4-order moment of each period of the first n periods and their average.

Preferably, the process of evaluating the covariance of the wave period of the bioelectrical signal is to compute the covariance of any two sequential periods of the first n periods.

Preferably, a feature vector is produced from the feature parameters.

Preferably, the feature vector is produced by sorting the feature parameters in a specific order.

Preferably, a match comparison is completed through such an approach as vector quantization, hidden Markov model, Dynamic Time Warping (DTW) or neural network.

Preferably, the process of capturing the bioelectrical signal of the user is to capture the bioelectrical signal together with the resistance, the temperature, the pulse and/or the humidity signal(s) of the user, which are collectively used as the bioelectrical signal of the user.

Preferably, the bioelectrical signal is the bioelectrical signal of cardiac muscle and/or brain wave.

Preferably, the bioelectrical signal is captured by measuring the potential difference between two hands.

In another aspect of the present invention, there is provided an apparatus for improving security of the security token, comprising: a bioelectrical detection unit for capturing a bioelectrical signal of the host user and processing the bioelectrical signal to produce a bioelectrical feature vector; and a security token unit for comparing the bioelectrical feature vector with the previously stored feature vector templates of that user, and allowing access from the host if a specified condition is satisfied.

Preferably, the apparatus further comprises a status display unit for displaying current processing status.

Preferably, the bioelectrical detection unit comprises: a capturing unit for capturing the bioelectrical signal of the host user; and a signal processing unit for processing the bioelectrical signal to produce a bioelectrical feature vector.

Preferably, the security token unit comprises: a storage unit for storing feature vector templates and other data; and a verification unit for comparing the bioelectrical feature vector with the previously stored feature vector templates and allowing the host to operate the data in the storage unit if a specified condition is satisfied.

Preferably, the host operates the data in the storage unit by reading, writing and/or encrypting/decrypting.

In a third aspect of the present invention, there is provided an apparatus for improving security of the security token, comprising: a bioelectrical signal capturer for capturing a bioelectrical signal of the host user; a memory for storing feature vector templates and other data; and a processor for processing the bioelectrical signal to produce a bioelectrical feature vector, comparing the bioelectrical feature vector with previously stored feature vector templates, and allowing access to the data in the memory from the host if a specified condition is satisfied.

The present invention provides a method and an apparatus which require verification of biometrics of the user before allowing the host to access the critical data in the security token. Because the biometrics are unique for every people and the duplicates of biometrics can be ignored and it's almost impossible to counterfeit biometrics, the security and reliability of security tokens are improved by verifying the biometrics of the user first.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention will be further described with the embodiments and the drawings as follows.

The present invention provides a method and an apparatus which require verification of biometrics of the host user before allowing the host to access the critical data in the security token. Because the biometrics are unique for every people and the duplicates of biometrics can be ignored and it's almost impossible to counterfeit biometrics, the security and reliability of security tokens are improved by verifying the biometrics of the user first. It is the most reliable to authenticate a person with biometrics in theory.

The bioelectricity is a kind of electrical phenomenon derived from within the organism. The bioelectricity is produced because the potential difference exists between the interior and the exterior of a cell membrane. When being silent, the potential inside the cell membrane is negative, and the potential outside the cell membrane is also negative. The potential difference is called the resting potential at this time. When being excited, the potential inside the cell membrane rises and exceeds that outside the cell membrane at the moment. The potential difference is called the action potential at this time, which exists for only several milliseconds. The potential difference changes to the original status when the spirit recovers to silence. The complex electrical changes rendered by the organs, such as the brain and the heart, are the general electrical changes of each of their component cells. Normally, an individual has a consistent bioelectrical signal, but prominent signal difference can be detected between different individuals.

In the present invention, the reliability and security of the security token are increased by adding a bioelectrical signal detection unit to the security token, which is used to capture the bioelectrical signal to be processed and compared with previously stored bioelectrical template information in the token. Only if a match has been found, can the critical data stored in the token be accessed by the host (connected with the security token).

Particularly, the bioelectrical signal could be the bioelectrical signal of cardiac muscle or the brain wave signal, which has higher signal strength. The captured signal is amplified and filtered. Then A/D conversion on some special points of the wave is performed to extract feature parameters, which are used for evaluating the feature vector. The feature vector is used by the security token in comparison with previously stored feature vector templates in the token. If the comparison result is greater than or equal to a previously specified threshold, it is sure that the user is valid. The host is allowed to access the security token. Otherwise, the user is invalid. The host cannot access the security token.

Figure 1:
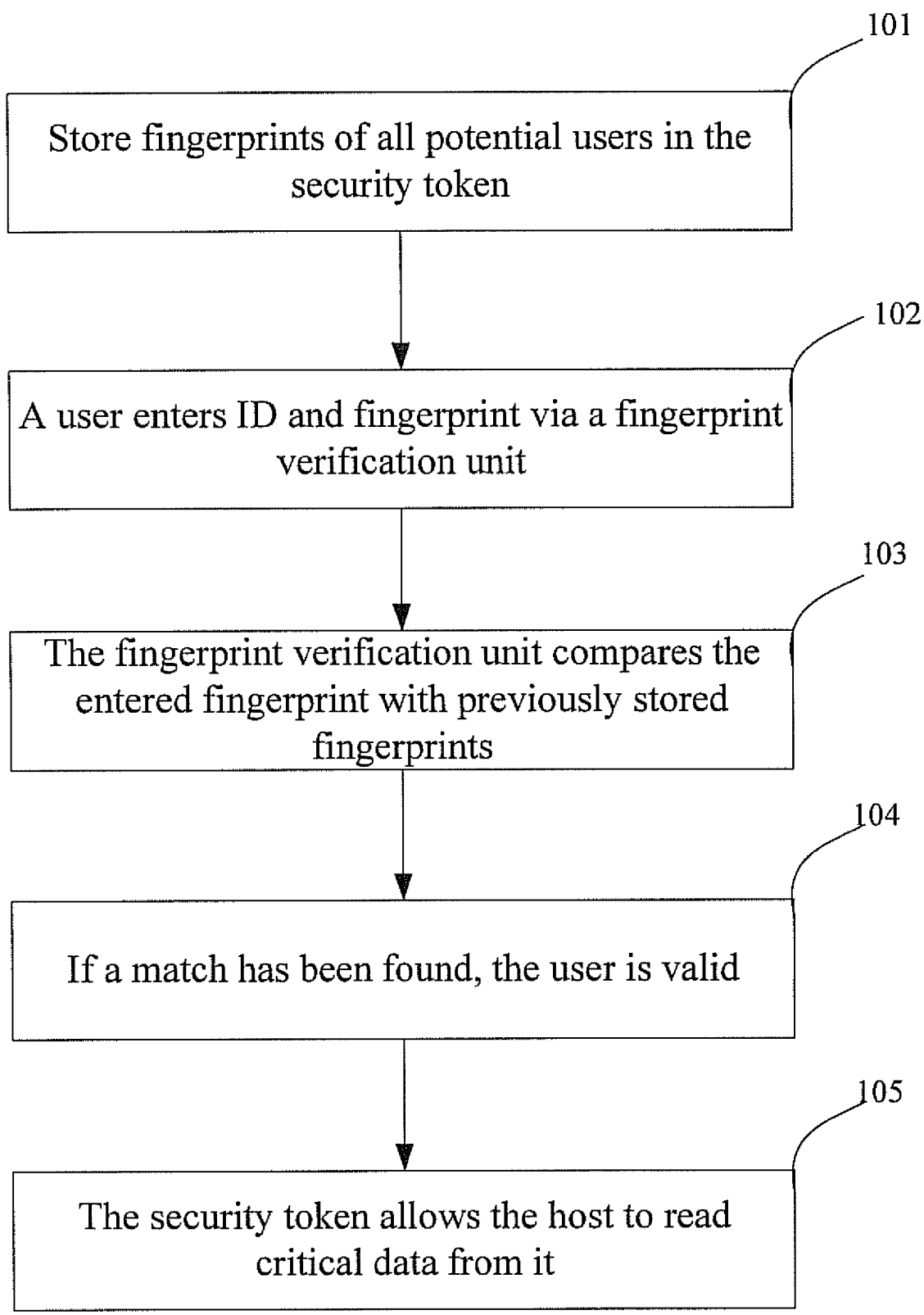
FIG. 1 is a flow diagram of a method for improving security of the security token according to the prior art.
Figure 2:
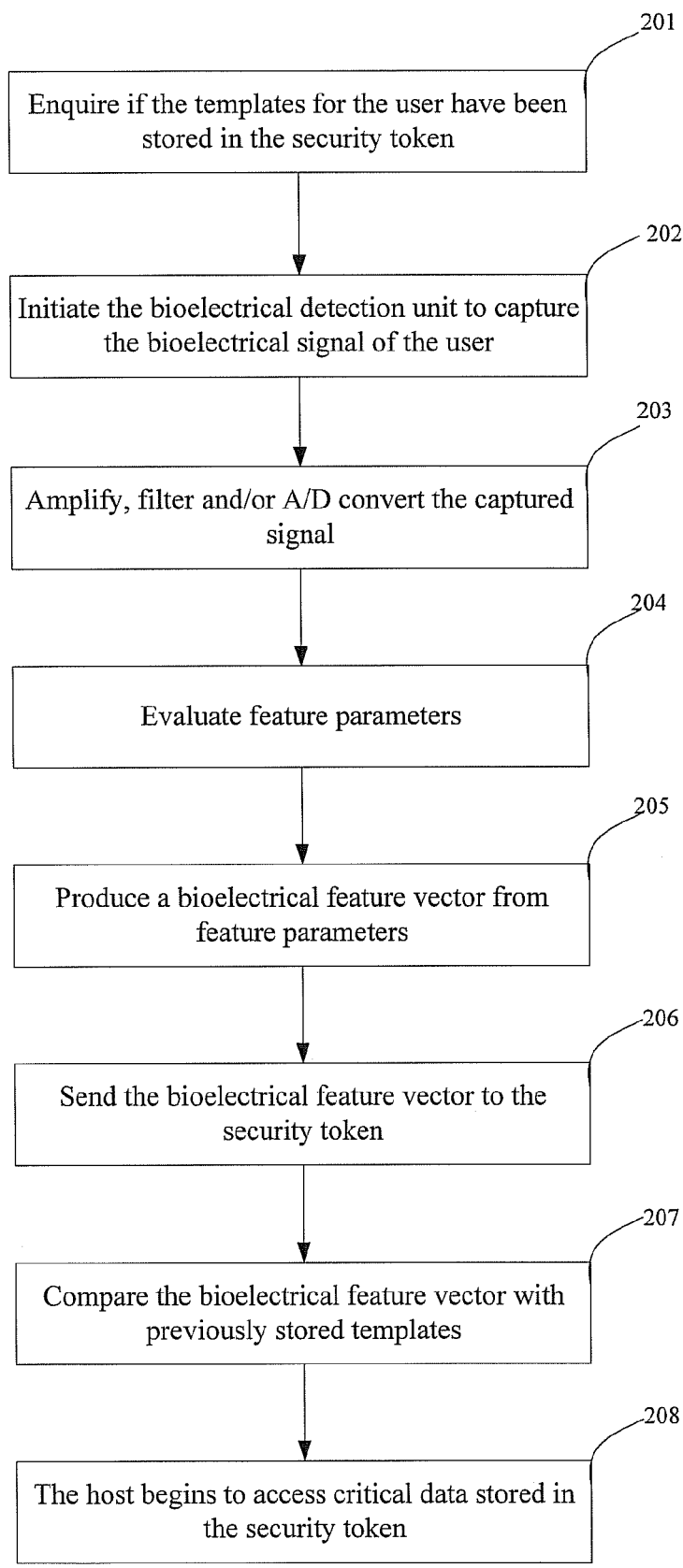
FIG. 2 is a flow diagram of an embodiment of a method for improving security of the security token according to the present invention.

Referring to FIG. 2, it is a flow diagram of an embodiment of the method for improving security of the security token according to the present invention, comprising the steps of:

Step 201: Enquiring if the bioelectrical feature vector templates of the host user have been stored in the security token;

The host user enters the user ID via the host. The host sends a query with the user ID to the security token for the bioelectrical feature vector templates of the user. The security token checks if the vector templates have been stored by the user ID. The result will be returned to the host.

If the vector templates have not been stored in the security token yet, the host stops to operate the token, and displays an error message to the user; otherwise, go to the next step.

Step 202: Capturing the bioelectrical signal of the user via the bioelectrical detection unit;

Preferably, the bioelectrical signal is that from the cardiac muscle. By fitting a finger clamping bioelectrical signal sensor on one of the user's fingers of a hand and another sensor on the same finger of another hand at one time, the bioelectrical signal of cardiac muscle can be detected between the two hands.

The electrical change arises first from the sinus node, and then moves to the atria and the ventricle through a specific path. The bioelectrical change is reflected on the body surface via conductor tissue and body fluid around the heart. In a heartbeat period, electrical change occurs for each part of the body regularly. The bioelectrical change could be plotted as a curve by putting a dedicated sensor on a particular part of the body. The bioelectrical signal represented by the curve could be detected by amplifying by means of a bioelectrical amplifier.

Figure 3:
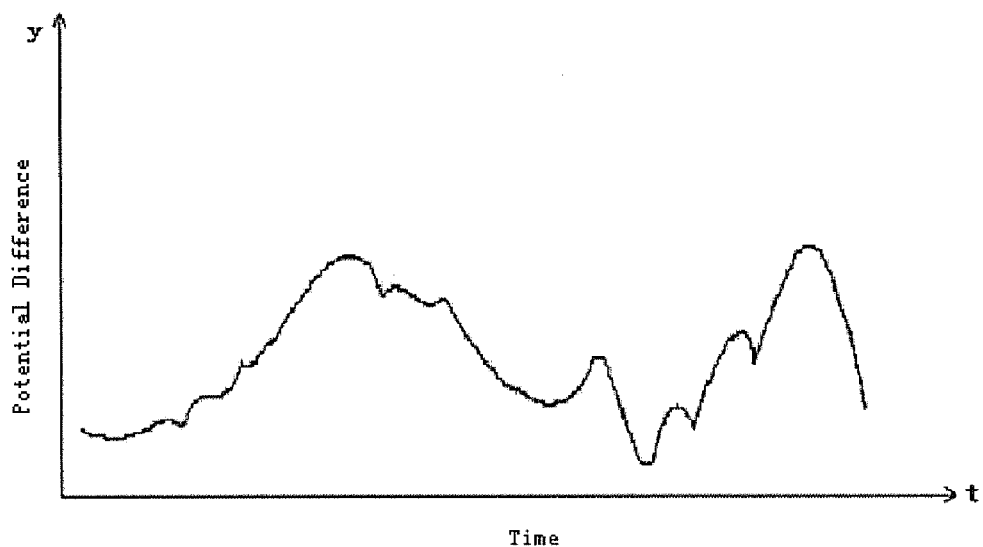
FIG. 3 is a schematic of changing on the potential difference for the bioelectrical signal of cardiac muscle in a period of time.
Figure 4:
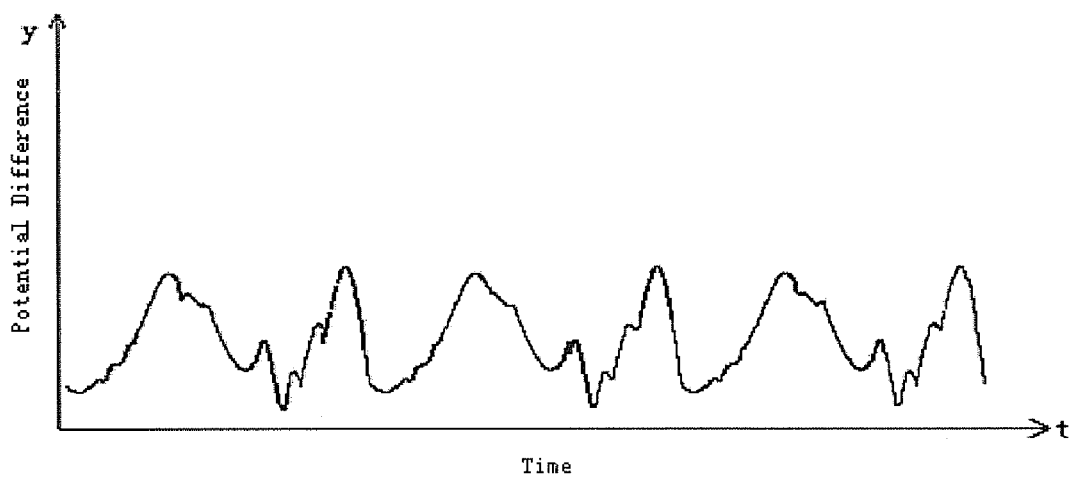
FIG. 4 is a wave diagram of the bioelectrical signal of cardiac muscle of a user.
Figure 5:
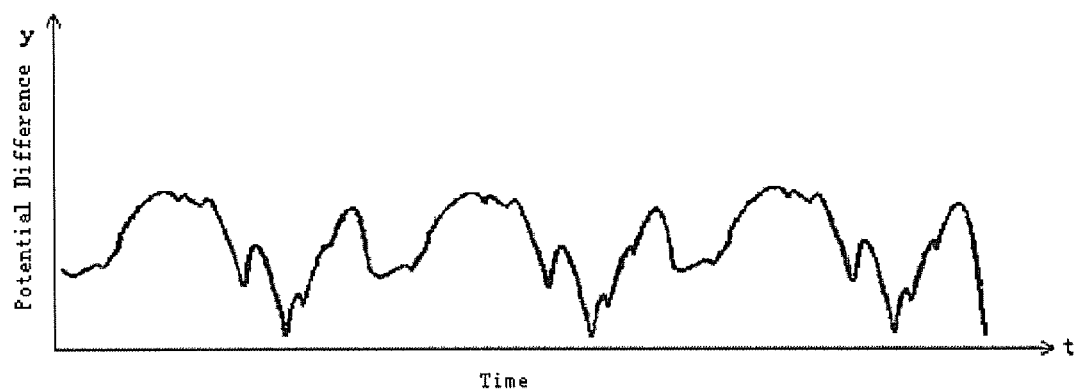
FIG. 5 is a wave diagram of the bioelectrical signal of cardiac muscle of another user.

Referring to FIG. 3, it's a schematic of potential difference for the bioelectrical signal of cardiac muscle changing over a period of time, which is a typical wave schematic of the bioelectrical signal. FIG. 4 and FIG. 5 provide two wave schematics for the bioelectrical signal of cardiac muscle for two different users. Although the bioelectrical signal of cardiac muscle for an individual changes with time and the detected part of body, the bioelectrical signal of cardiac muscle for the individual keeps stable on the whole, and that signal for two different people differs very much. Therefore, it is easy to identify an individual by the bioelectrical signal of cardiac muscle.

Step 203: Amplifying, filtering and/or A/D converting the bioelectrical signal;

The captured bioelectrical signal is amplified through a signal amplifier and filtered.

Step 204: Detecting on some special points of the processed bioelectrical signal and evaluating feature parameters;

Feature parameters to be extracted must be able to represent the basic features of a person and identify that person. And the parameters should keep stable for the same person relatively. In addition, preferably it is easy to evaluate the parameters with a certain high-performance algorithm.

Figure 6:
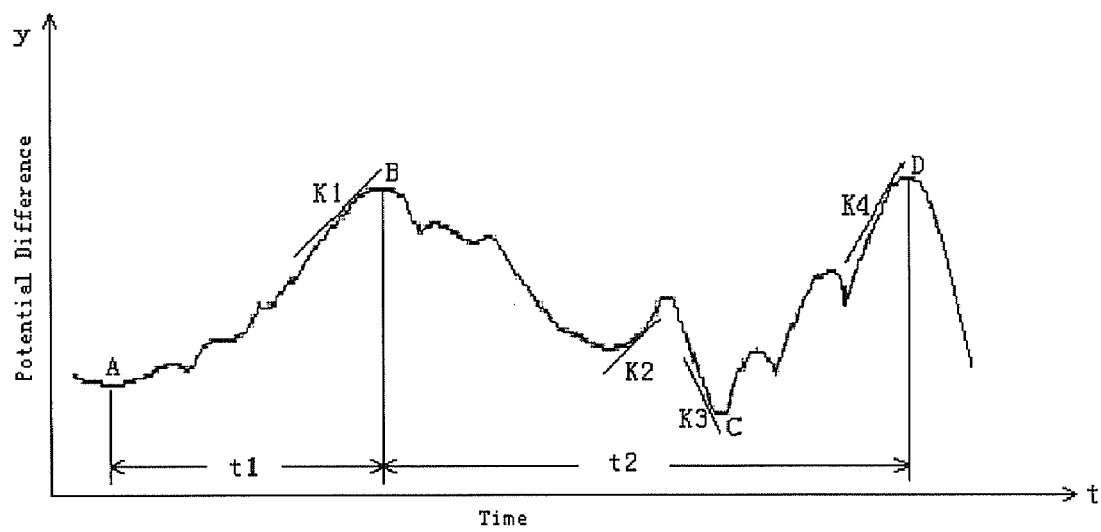
FIG. 6 is a schematic of primary feature parameters of the bioelectrical signal of cardiac muscle.

Referring to FIG. 6, it's a schematic of the primary feature parameters of the bioelectrical signal of cardiac muscle. The feature parameters of the bioelectrical signal involve the peak and valley points. Appropriately, the feature parameters include ascending and descending slopes—$k_1, k_2, k_3$, and $k_4$ and intervals—$t_1$ and $t_2$. In particular, the following operations can be performed:

evaluating the slopes of a wave period of the bioelectrical signal;

evaluating the time to peak of the wave period of the bioelectrical signal;

evaluating the variance of values of sampling points of the wave period of the bioelectrical signal;

evaluating the high-order moment of the wave period of the bioelectrical signal;

evaluating the covariance of the wave period of the bioelectrical signal.

Preferably, said slopes of the wave period of the bioelectrical signal include the ascending slope from the origin to the first peak, the ascending slope from the first valley to the second peak, the descending slope from the peak to the lowest point, and the ascending slope of the last peak.

Preferably, said time to peak of the wave period of the bioelectrical signal includes the time elapsed from the origin to the first peak, and the time elapsed from the first peak to the last peak.

Preferably, the process of evaluating the variance of values of sampling points of the wave period of the bioelectrical signal is to compute the variances of the values of the sampling points of the first n periods and their average.

Preferably, the process of evaluating the high-order moment of the wave period of the bioelectrical signal is to compute the 4-order moment of each period of the first n periods and their average.

Preferably, the process of evaluating the covariance of the wave period of the bioelectrical signal is to compute the covariance of any two sequential periods of the first n periods (n>1).

After evaluating the feature parameters, the feature vector of the bioelectrical signal is produced by sorting the feature parameters in a specific order. For example:

Feature Vector={$k_1, k_2, k_3, k_4, t_1, t_2, \sigma^2, E, Cov$}

Step 205: Evaluating the bioelectrical feature vector from the feature parameters of the bioelectrical signal;

Sorting the feature parameters in a specific order is to produce the feature vector of the bioelectrical signal.

Step 206: Sending the bioelectrical feature vector to the security token;

Step 207: Comparing the bioelectrical feature vector with previously stored bioelectrical feature vector templates by the security token;

The comparison result is returned to the host. If the result is greater than or equal to a previously specified threshold, the user is a valid user and the host connected with the security token is allowed to access the token; otherwise, the user is not a valid user and the host is not allowed to access the token (in this case, the last step can be ignored).

The comparison is completed through such an approach as vector quantization, hidden Markov model, Dynamic Time Warping (DTW) or neural network, which is highly reliable and has been widely used for audio signal processing.

Step 208: Beginning to access the critical data stored in the security token by the host. The host could perform the following operations on the protected data: read, write, encrypt/decrypt and so forth.

The resistance, temperature, humidity or pulse of body can also be used to authenticate a user. Or, these feature signals could be averaged with the bioelectrical signal to produce a feature vector for comparing with templates, further improving the reliability and security of authentication to the user.

Figure 7:
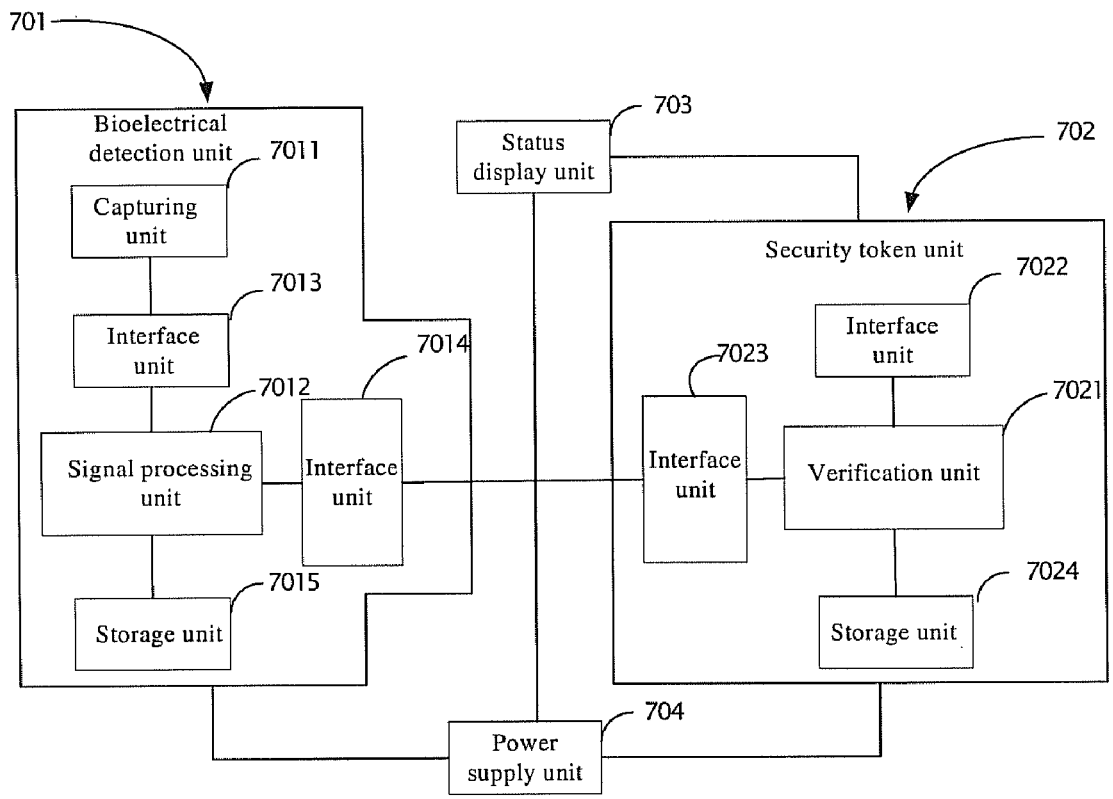
FIG. 7 is a diagram of an embodiment of the apparatus for improving security of security token according to the present invention.

In another aspect of the present invention, there is provided an apparatus for improving security of the security token. Referring to FIG. 7, an embodiment of the apparatus comprises: a bioelectrical detection unit 701, a security token unit 702, a status display unit 703, and a power supply unit 704.

Further, the bioelectrical detection unit 701 comprises a capturing unit 7011, a signal processing unit 7012, an interface unit 7013, an interface unit 7014, and a storage unit 7015. The security token unit 702 comprises a verification unit 7021, an interface unit 7022, an interface unit 7023, and a storage unit 7024.

To enable the host to access the critical data in the security token, the user must first enter a user ID on the host. The host sends the user ID to the verification unit 7021 via the interface unit 7022. The verification unit 7021 checks if the bioelectrical vector templates for the user are stored in the storage unit 7024 and returns the result to the host. The storage unit 7024 comprises a RAM, an EEPROM, or a FLASH memory.

If no template has been stored for the user, the host cannot operate the data in the security token and it will send an error message to the status display unit 703; if a match has been found, the host sends a command via the interface unit 7022 for capturing the bioelectrical information of the user.

The interface unit 7022 forwards the command to the verification unit 7021. The verification unit 7021 sends the command to the signal processing unit 7012 via the interface unit 7023 and the interface unit 7014. The signal processing unit 7012 initiates the capturing unit 7011 via the interface unit 7013.

The capturing unit 7011 captures the bioelectrical signal of the user, which preferably is the bioelectrical signal of cardiac muscle or brain wave. The bioelectrical signal can be captured by measuring the potential difference between the two hands. The capturing unit 7011 transfers the captured bioelectrical signal to the signal processing unit 7012 via the interface unit 7013.

The signal processing unit 7012 amplifies and filters the captured signal before converting the signal to feature parameters. To extract feature parameters of the bioelectrical signal from the processed bioelectrical signals comprises:
  evaluating the slopes of a wave period of the bioelectrical signal;
  evaluating the time to peak of the wave period of the bioelectrical signal;
  evaluating the variance of values of sampling points of the wave period of the bioelectrical signal;
  evaluating the high-order moment of the wave period of the bioelectrical signal; and
  evaluating the covariance of the wave period of the bioelectrical signal.

Preferably, said slopes of the wave period of the bioelectrical signal include the ascending slope from the origin to the first peak, the ascending slope from the first valley to the second peak, the descending slope from the peak to the lowest point, and the ascending slope of the last peak.

Preferably, said time to peak of the wave period of the bioelectrical signal includes the time elapsed from the origin to the first peak, and the time elapsed from the firs peak to the last peak.

Preferably, the process of evaluating the variance of values of sampling points of the wave period of the bioelectrical signal is to compute the variances of the values of the sampling points of the first n periods and their average.

Preferably, the process of evaluating the high-order moment of the wave period of the bioelectrical signal is to compute the 4-order moment of each period of the first n periods and their average.

Preferably, the process of evaluating the covariance of the wave period of the bioelectrical signal is to compute the covariance of any two sequential periods of the first n periods (n>1).

After evaluating the feature parameters, the feature vector of the bioelectrical signal is produced by sorting the feature parameters in a specific order. For example:

Feature Vector={k1, k2, k3, k4, t1, t2, $\sigma^2$, E, Cov}

The signal processing unit 7012 sends the bioelectrical feature vector to the verification unit 7021 via the interface unit 7014 and the interface unit 7023. The signal processing unit 7012 stores data required in processing in the storage unit 7015. The storage unit 7015 comprises a RAM, a FLASH memory and/or an external storage.

The verification unit 7021 compares the bioelectrical feature vector resulted from the captured signal with the bioelectrical feature vector templates read from the storage unit 7024. The user is confirmed to be valid only if the result of the comparison of the bioelectrical feature vector with stored templates is greater than or equal to a previously specified threshold.

The verification unit 7021 sends the final result to the host via the interface unit 7022. If the user is valid, the verification unit 7021 allows the host to access the critical data in the storage unit 7024. The host could read the critical data from the storage unit 7024; otherwise, the host sends an error message to the status display unit 703, which then displays the message.

The power supply unit 704 supplies power to the bioelectrical detection unit 701, the security token unit 702, and the status display unit 703.

Figure 8:
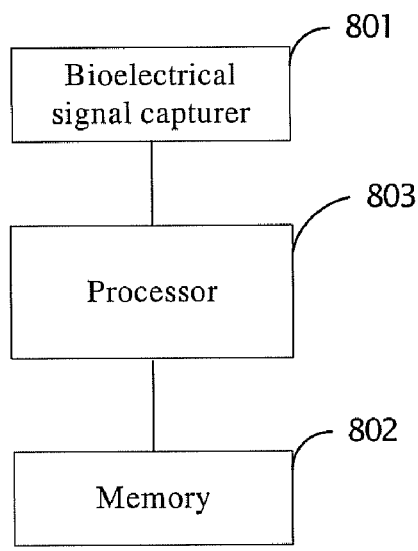
FIG. 8 is a diagram of another embodiment of the apparatus for improving security of security token according to the present invention.

Referring to FIG. 8, it's a diagram of another embodiment of the apparatus for improving security of the security token, which comprises a bioelectrical signal capturer 801, a memory 802 and a processor 803.

The bioelectrical signal capturer 801 captures the bioelectrical signal of the host user in response to the command from the processor 803, and transmits the signal to the processor 803.

The processor 803 amplifies and filters the bioelectrical signal, converts the signal to feature parameters, sorts the feature parameters in a specific order forming a bioelectrical feature vector.

Next, the processor 803 compares the bioelectrical feature vector with the bioelectrical feature vector templates for the user read from the memory 802. If the result of the comparison is greater than or equal to a previously specified threshold, the user is valid; otherwise, the user is not valid.

The processor 803 sends the final result to the host. If the user is confirmed to be valid, the host is allowed to access the critical data stored in the memory 802.

The memory 802 comprises a RAM, a FLASH memory, an EEPROM and/or an external storage for storing the temporary data, the bioelectrical feature vector templates for the user and other critical data.

It will be appreciated by those skilled in the art that the invention can be embodied in other specific forms without departing from the spirit or essential characters thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for improving security of a security token comprising the steps of:
  detecting a bioelectrical signal of cardiac muscle of a host user;
  extracting a bioelectrical feature parameter from the bioelectrical signal of the cardiac muscle;
  processing the bioelectrical signal to produce a bioelectrical feature vector of the cardiac muscle; and
  allowing the host user to access data stored in the security token after verifying the host user, and the host user operating on the stored data by reading, writing, and encrypting/decrypting;
  wherein detecting the bioelectrical signal of the host user further comprising the steps of:
    capturing the bioelectrical signal of the host user;
    processing the captured bioelectrical signal to produce a bioelectrical feature vector;
    comparing the bioelectrical feature vector with previously stored feature vector template; and
    verifying the host user if the comparison result is greater than or equal to a previously specified conditional value;
  wherein the previously specified conditional value is a threshold, the bioelectrical signal of the host user being verified is compared with the threshold, and the host user is a valid user if the comparison result is greater than or equal to the threshold;

wherein processing the bioelectrical signal to produce the bioelectrical feature vector further comprising the steps of:
handling the captured bioelectrical signal by such operations as amplifying, filtering, and/or A/D converting;
extracting a bioelectrical feature parameter from the handled bioelectrical signal; and
evaluating the bioelectrical feature vector from the bioelectrical feature parameters; and
wherein extracting the bioelectrical feature parameters from the handled bioelectrical signal further comprising the steps of:
evaluating a slope of a wave period of the bioelectrical signal;
evaluating a time to peak of the wave period of the bioelectrical signal;
evaluating a variance of values of sampling points of the wave period of the bioelectrical signal;
evaluating a high-order moment of the wave period of the bioelectrical signal; and
evaluating a covariance of the wave period of the bioelectrical signal.

2. The method of claim 1, wherein the evaluating the slopes of the wave period of the bioelectrical signal includes, for each wave period of the bioelectrical signal, evaluating an ascending slope from the origin to the first peak, and ascending slope from the first valley to the second peak, a descending slope from the peak to the lowest point, and an ascending slope of the last peak.

3. The method of claim 1, wherein the time to peak of the wave period of the bioelectrical signal includes a time elapsed from the origin to the first peak, and a time elapsed from the first peak to the last peak.

4. The method of claim 1, wherein evaluating the variance of values of sampling points of the wave period of the bioelectrical signal is to compute the variances of the values of the sampling points of the first n periods and their average.

5. The method of claim 1, wherein evaluating the high-order moment of the wave period of the bioelectrical signal is to compute a 4-order moment of each period of the first n periods and their average.

6. The method of claim 1, wherein evaluating the covariance of the wave period of the bioelectrical signal is to compute a covariance of any two sequential periods of the first n periods.

7. The methods of claim 1, wherein the bioelectrical feature vector is produced by sorting the bioelectrical feature parameters in a specific order.

8. The method of claim 1, wherein said comparing is completed through such an approach as a vector quantization, a hidden Markov model, a Dynamic Time Warping (DTW) or a neural network methodologies.

9. The method of claim 1, wherein capturing the bioelectrical signal of the host user further includes capturing a resistance, a temperature, a pulse and/or a humidity signal(s) of the host user.

10. The method of claim 1, wherein the bioelectrical signal is captured by measuring a potential difference between the two hands.

11. An apparatus for improving security of a security token, said apparatus comprises:
a bioelectrical detection unit for capturing a bioelectrical signal of a cardiac muscle of the host user and processing the bioelectrical signal to produce a bioelectrical feature vector, and
a security token unit for comparing the bioelectrical feature vector with the previously stored feature vector templates of that host user, and allowing the host user to operate data in a storage unit of the security token unit if a specified condition is satisfied, and the host user operates on the data by reading, writing, and encrypting/decrypting,
wherein the bioelectrical detection unit comprises:
a capturing unit for capturing the bioelectrical signal of the host user; and
a signal processing unit for processing the bioelectrical signal to produce a bioelectrical feature vector, and
wherein the signal processing unit amplifies and filters the captured signal before converting the signal to feature parameters, and extracting a bioelectrical feature parameter from the processed bioelectrical signal; and
evaluating the bioelectrical feature vector from the bioelectrical feature parameters; and
wherein extracting the bioelectrical feature parameters from the processed bioelectrical signals comprises:
evaluating a slope of a wave period of the bioelectrical signal;
evaluating a time to peak of the wave period of the bioelectrical signal;
evaluating a variance of values of sampling points of the wave period of the bioelectrical signal;
evaluating a high-order moment of the wave period of the bioelectrical signal; and
evaluating a covariance of the wave period of the bioelectrical signal.

12. The apparatus of claim 11, wherein the apparatus further comprises: a status display unit for displaying current processing status.

13. An apparatus for improving security of the security token, said apparatus comprises:
a bioelectrical signal capturer for capturing a bioelectrical signal of a cardiac muscle of a host user;
a memory for storing feature vector templates and other data; and
a processor for processing the bioelectrical signal to produce a bioelectrical feature vector, comparing the bioelectrical feature vector with previously stored feature vector templates, and allowing access to the data in the memory from the host user if a specified condition is satisfied, and the host user operates on the data by reading, writing, and encrypting/decrypting,
wherein the processor amplifies and filters the bioelectrical signal, converts the signal to feature parameters, sorts the feature parameters in a specific order forming a bioelectrical feature vector, and extracting a bioelectrical feature parameter from the processed bioelectrical signal; and
evaluating the bioelectrical feature vector from the bioelectrical feature parameters; and
wherein extracting the bioelectrical feature parameters from the processed bioelectrical signals comprises:
evaluating a slope of a wave period of the bioelectrical signal;
evaluating a time to peak of the wave period of the bioelectrical signal;
evaluating a variance of values of sampling points of the wave period of the bioelectrical signal;
evaluating a high-order moment of the wave period of the bioelectrical signal; and
evaluating a covariance of the wave period of the bioelectrical signal.

* * * * *